Aug. 22, 1933.  W. G. DUNN  1,923,301
AWNING STRUCTURE
Filed Jan. 26, 1931
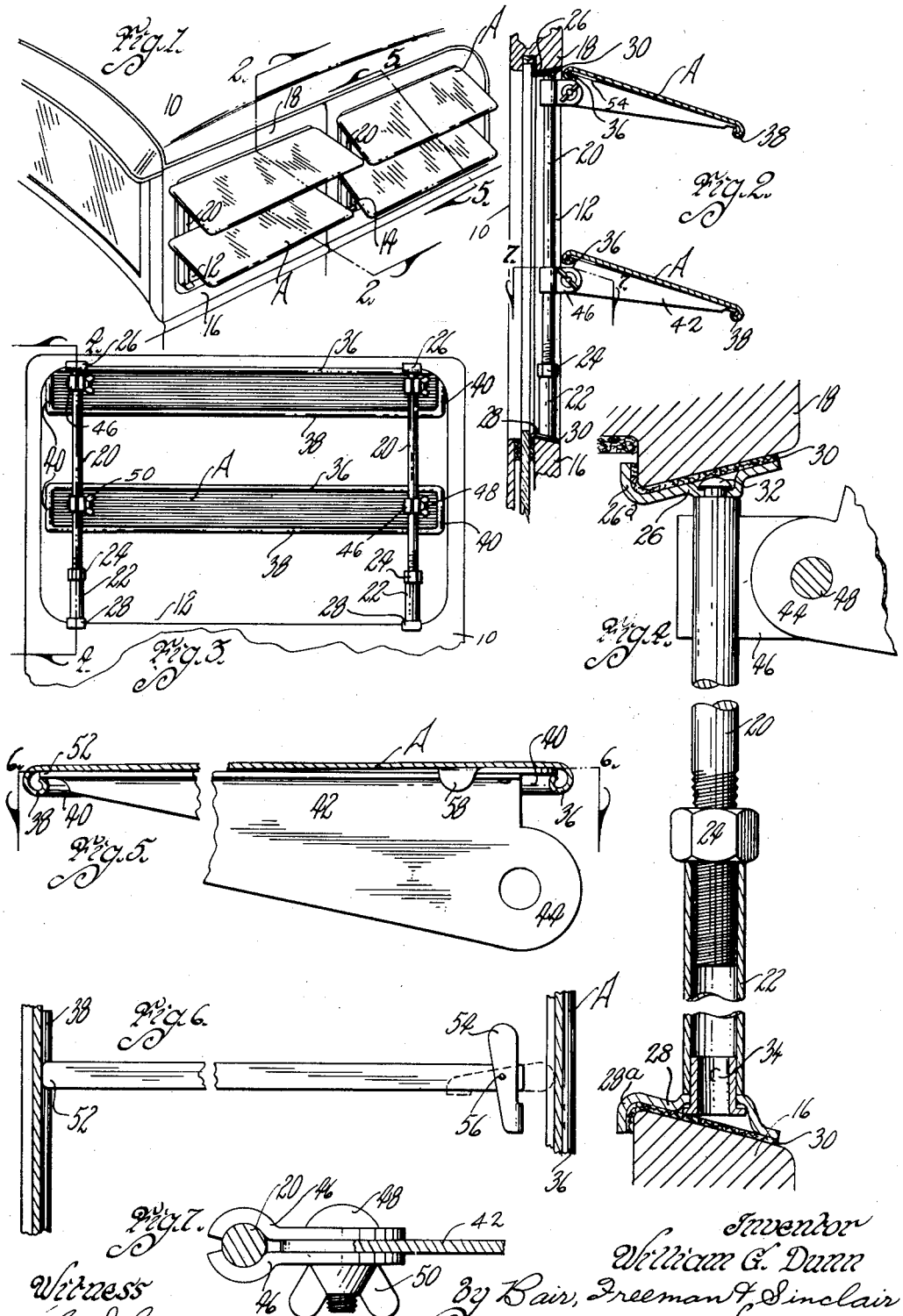

Patented Aug. 22, 1933

1,923,301

UNITED STATES PATENT OFFICE 1,923,301

AWNING STRUCTURE

William G. Dunn, Clarinda, Iowa

Application January 26, 1931. Serial No. 511,354

5 Claims. (Cl. 296—44)

One object of my present invention is to provide an awning or sun-shade structure for automobiles or the like of simple, durable and inexpensive construction from a manufacturing standpoint.

A further object is to provide an awning element supporting means vertically arranged with respect to a window frame, whereby a pair of awning elements may be longitudinally adjusted on said supports so that one awning element can be adjusted toward or away from the other, depending on the most effective positions of the two awnings for preventing the entrance of sunlight through the window frame.

A further object is to provide expansible supports provided with feet especially adapted for coaction with the upper and lower rails of an automobile window frame.

Still another object is to provide clip means for supporting the awning elements with respect to the vertical supports, clamping bolts being extended through the clip means and the parts being so arranged that the clips can be vertically adjusted without changing the angle of the awning elements with respect to the clips.

A further object is to provide awning elements of sheet metal or the like having beaded edges and a novel type of bracket for coaction therewith, so that the awning is removable relative to the bracket and the bracket is adjustable lengthwise of the awning.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of a front corner of an automobile showing pairs of my awning structures applied to two windows of the automobile.

Figure 2 is an enlarged sectional view on the line 2—2 of Figure 1.

Figure 3 is an inside elevation of a window frame showing the awnings thereon.

Figure 4 is an enlarged sectional view on the line 4—4 of Figure 3 showing the expansible supports in detail.

Figure 5 is a sectional view on the line 5—5 of Figure 1 showing the coaction of an awning bracket with an awning element.

Figure 6 is a sectional view on the line 6—6 of Figure 5; and

Figure 7 is an enlarged sectional view on the line 7—7 of Figure 2.

On the accompanying drawing, I have used the reference numeral 10 to indicate generally an automobile. The automobile 10 is provided with window openings 12 and 14, each bounded by a window frame, the lower rail of which is indicated at 16 and the upper rail at 18.

My awning structure comprises supporting rods 20 and associated parts and awning elements A having means for supporting the awning elements on the rods 20. The parts associated with each rod 20 are a sleeve 22, a nut 24 and foot members 26 and 28.

The foot members 26 and 28 are each provided with a flange portion 26a and 28a, respectively, adapted to engage over the edge of the rails 18 and 16, as best shown in Figure 4. Felt padding 30 may be provided between the foot members and the rails so as not to mar the finish of the automobile. The foot member 26 is somewhat loosely riveted to the upper end of the rod 20 a head 22 being formed thereon to prevent removal of the foot member from the rod. The lower end of the sleeve 22 is connected with the foot member 28 by means of a tubular rivet 34 extended into the lower end of the sleeve and spot-welded thereto. It will be noted that the joint between the rivet 34 and the foot member 28 is also loose, the purpose of this being to permit slight adjusting movement of the foot members 26 and 28 to accommodate different window frame rails 18 and 16.

Each awning element A is preferably made of sheet metal with upper and lower rolled flanges or beads 36 and 38 and similar sides flanges 40. A pair of brackets 42 is provided for each awning element A and each has a performated ear 44 adapted to be clamped between clips 46 by means of a clamping bolt 48 and wing nut 50. The clips 46, as best shown in Figure 7, engage the rods 20 for thereby supporting the clips 46, brackets 42 and the awning element A on the rod.

The clamping bolt 48 causes tight frictional engagement between the brackets 42 and the clips 46 so as to retard swinging movement of the adjustable awning element A after the nuts 50 have been tightened. The portions of the clips 46, however, which engage the rod 20 are somewhat spaced from the clamping bolt 48 and thus, through frictionally engaging the rod, the frictional engagement is not as tight as between the clips and the bracket 42. Consequently, the awning elements will remain at any elevation to which they are adjusted, but may be adjusted to another elevation by manually pushing the clips up or down, and the awning elements can be adjusted as to inclination by manually raising or lowering their outer edges.

I have provided vertical supports in the form of the rods 20 for the awning elements A so that the awning elements can be vertically adjusted, which is very desirable since often, one awning does not shade the occupant of the automobile from all of the sunlight and a second awning element will do so, however, if positioned at just the right elevation. Thus by providing the rods 20 vertical and adjusting the clips 46 longitudinally of them, vertical adjustment of the awning elements is affected.

The awning elements A may be retained on the brackets 42 in any desired manner. On the drawing, I have illustrated a flange 52 at one end of the bracket for engagement in the lower flange 38 of the awning element (see Figure 5). A cam member 54 is pivoted at the opposite end of the bracket and is engageable under the upper flange 36. The cam member 54 is pivoted at 56 and has a wing 58 to be engaged by the person installing the awning structure for the purpose of swinging the cam from the full line position to the dotted line position shown in Figure 6. This arrangement makes an easily assembled awning structure which can be shipped in knocked-down condition and can be quickly installed on an automobile without the use of any special tools. The awning elements are so positioned that they are entirely outside of the outer surface of the automobile, as shown in Figure 2 and consequently can extend over the side edges of the window frame if they are too long.

Some changes may be made in the construction and arrangement of the parts of my awning structure for automobiles without departing from the real spirit and purpose of my invention, and it is my intention to cover by my claims, any modified forms of structure or use of mechanical equivalents, which may be reasonably included within their scope.

I claim as my invention:

1. For use with the upper and lower rails of a window frame, vertically disposed expansible supports associated with said rails and means vertically slidable thereon for supporting an awning element, said means comprising clips engaging said supports and clamping bolts through said clips, said awning element having brackets associated with said clips, pivoted on said clamping bolts and frictionally engaging said clips at points surrounding said clamping bolts when the bolts are tight.

2. For use with a window frame, vertically disposed supports and an awning element supported thereby, said awning element having brackets, clips associated with said brackets, clamping bolts through said brackets and said clips for securing the clips to the brackets and to said supports, said clips being movable longitudinally on the supports and engaging them at points spaced from said clamping bolts, said bolts, when tight, permitting movement of the clips relative to the supports but preventing any change in the angle of the awning element with respect to the clips.

3. In a device of the class described, an awning element, flanges along opposite edges thereof and a bracket for said awning element comprising a bracket member having one end adapted to coact with one of said flanges and a cam member pivoted to the bracket member at its other end and adapted to coact with the other flange of the awning element.

4. In a device of the class described, an awning element, and a bracket for said awning element comprising a bracket member having one end adapted to coact with one edge of said awning element and a member at the other end of the bracket member and capable of coaction or non-coaction with the other flange of said awning element.

5. In a device of the class described, an awning element and a bracket for said awning element comprising a bracket member having one end adapted to coact with one edge of said awning element and a cam member pivoted to the bracket member at its other end and adapted to coact with the other edge of the awning element.

WILLIAM G. DUNN.